US011088893B2

(12) United States Patent
Novo Diaz et al.

(10) Patent No.: US 11,088,893 B2
(45) Date of Patent: Aug. 10, 2021

(54) METHODS AND DEVICES FOR NEGOTIATING SESSION DESCRIPTOR PARAMETERS

(71) Applicant: Telefonaktiebolaget LM Ericsson (publ), Stockholm (SE)

(72) Inventors: Oscar Novo Diaz, Helsinki (FI); Sarantorn Bisalbutra, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 15/525,473

(22) PCT Filed: Nov. 12, 2014

(86) PCT No.: PCT/SE2014/051343
§ 371 (c)(1),
(2) Date: May 9, 2017

(87) PCT Pub. No.: WO2016/076773
PCT Pub. Date: May 19, 2016

(65) Prior Publication Data
US 2017/0325125 A1     Nov. 9, 2017

(51) Int. Cl.
*H04L 29/06*     (2006.01)
*H04W 28/06*     (2009.01)
*H04W 4/70*      (2018.01)

(52) U.S. Cl.
CPC .......... *H04L 29/06* (2013.01); *H04L 65/1006* (2013.01); *H04L 69/04* (2013.01);
(Continued)

(58) Field of Classification Search
CPC ..... H04L 29/06; H04L 65/1006; H04L 69/04; H04L 69/22; H04L 69/24; H04L 29/06027; H04L 63/0428; H04W 28/06; H04W 4/70
See application file for complete search history.

(56) References Cited

U.S. PATENT DOCUMENTS

| 7,289,464 | B2 * | 10/2007 | Li | H04L 65/1006 370/328 |
| 7,561,081 | B2 * | 7/2009 | Krimerman | H03M 7/30 341/106 |
| 8,549,143 | B2 * | 10/2013 | Mandato | H04L 29/06027 370/253 |

(Continued)

FOREIGN PATENT DOCUMENTS

| EP | 1376878 A1 | 1/2004 |
| EP | 2184889 A1 | 5/2010 |
| EP | 2782367 A1 | 9/2014 |

OTHER PUBLICATIONS

Cirani, Simone, Marco Picone, and Luca Veltri. "CoSIP: a constrained session initiation protocol for the internet of things." European Conference on Service-Oriented and Cloud Computing. Springer, Berlin, Heidelberg, 2013. (Year: 2013).*

(Continued)

*Primary Examiner* — Philip J Chea
*Assistant Examiner* — Ruth Solomon
(74) *Attorney, Agent, or Firm* — Sage Patent Group

(57) ABSTRACT

The disclosure relates to a method performed in a first device for negotiating session descriptor parameters with a second device over an application layer protocol. The method comprises converting a value of a text based session descriptor parameter of a session description protocol, SDP, message into a binary format; encapsulating the converted SDP message into an application layer protocol message; and sending the application layer protocol message to the second device.

30 Claims, 8 Drawing Sheets

(52) U.S. Cl.
CPC .............. *H04L 69/22* (2013.01); *H04L 69/24* (2013.01); *H04W 28/06* (2013.01); *H04L 29/06027* (2013.01); *H04L 63/0428* (2013.01); *H04L 65/1063* (2013.01); *H04W 4/70* (2018.02)

(56) References Cited

U.S. PATENT DOCUMENTS

| | | | | |
|---|---|---|---|---|
| 9,197,676 | B2* | 11/2015 | Buckley | H04L 69/04 |
| 2004/0162032 | A1* | 8/2004 | Li | H04L 65/1006 455/72 |
| 2005/0060411 | A1* | 3/2005 | Coulombe | H04L 29/06 709/227 |
| 2006/0026288 | A1* | 2/2006 | Acharya | G06Q 10/10 709/227 |
| 2007/0153775 | A1* | 7/2007 | Renschler | H04L 65/1026 370/356 |
| 2007/0180133 | A1* | 8/2007 | Vedantham | H04L 12/1836 709/230 |
| 2011/0173434 | A1* | 7/2011 | Buckley | H04L 65/1006 713/150 |
| 2011/0270895 | A1 | 11/2011 | Shelby | |
| 2012/0135724 | A1* | 5/2012 | Lewis | H04W 92/20 455/422.1 |
| 2013/0179557 | A1* | 7/2013 | Bian | H04L 41/00 709/223 |
| 2014/0184733 | A1* | 7/2014 | Liu | H04N 7/142 348/14.09 |

OTHER PUBLICATIONS

International Search Report and Written Opinion of the International Searching Authority for International Application No. PCT/SE2014/051343 (Aug. 14, 2015).
Handley et al., "SDP: Session Description Protocol," RFC 4566, 49 pages (Jul. 2006).
Shelby et al., "The Constrained Application Protocol (CoAP)," IETF RFC 7252, 112 pages (Jun. 2014).
Changwoo Yoon et al., "Distributed sensor device resource-object connection based on service delivery platform," 2014 20th IEEE International Conference on Parallel and Distributed Systems, Abstract, 2 pages (Dec. 16, 2014).
Extended European Search Report for European Patent Application No. 14905893.5 (dated Jul. 18, 2017).
Intellectual Property India, Indian Office Action, Application No. 201717013306, dated Sep. 25, 2019, 6 pages.

* cited by examiner

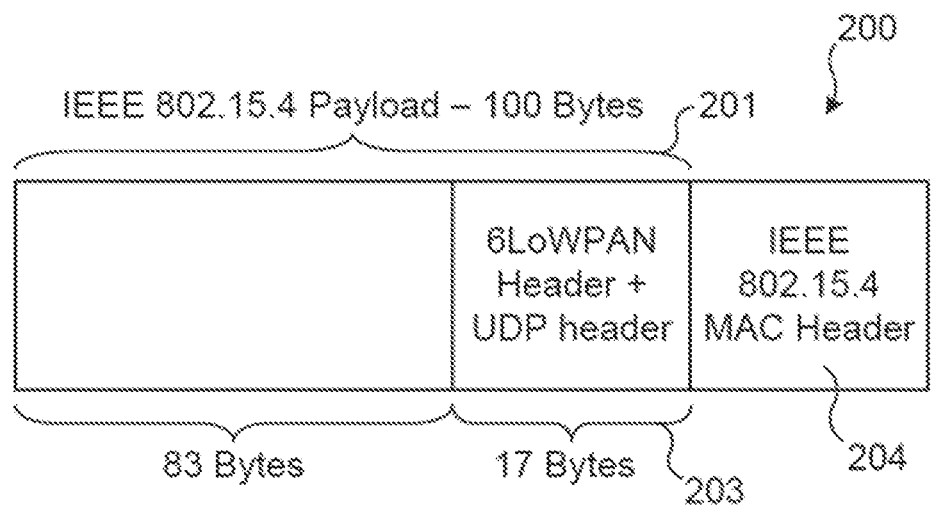
Fig. 1 Prior Art
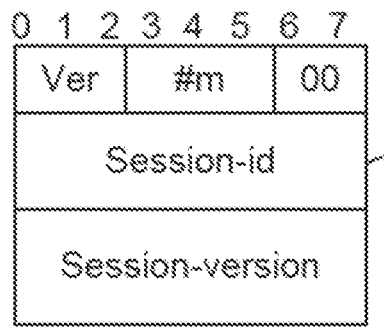
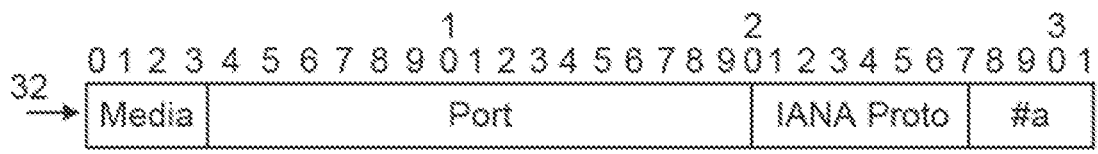
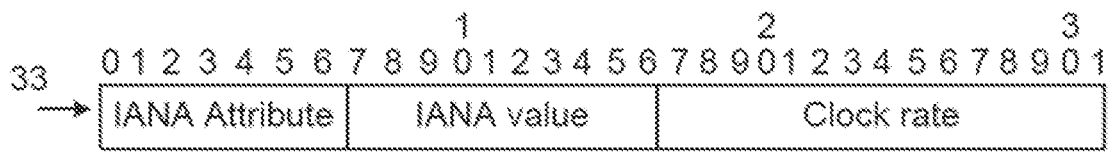
Fig. 2

```
                                                  40

Header Format 0                   1                   2                   3
    0 1 2 3 4 5 6 7 8 9 0 1 2 3 4 5 6 7 8 9 0 1 2 3 4 5 6 7 8 9 0 1
    ver   #m     00           Session-Id
    +-+-+-+-+-+-+-+-+-+-+-+-+-+-+-+-+-+-+-+-+-+-+-+-+-+-+-+-+-+-+-+-+
    | 000 |0010 | 00 |     10100111 01101011 10010001            |
    +-+-+-+-+-+-+-+-+-+-+-+-+-+-+-+-+-+-+-+-+-+-+-+-+-+-+-+-+-+-+-+-+
    | 00010100       |    10100111 01101011 10010001             | Session-Version
    +-+-+-+-+-+-+-+-+-+-+-+-+-+-+-+-+-+-+-+-+-+-+-+-+-+-+-+-+-+-+-+-+
    | 00010100       |
    +-+-+-+-+-+-+-+-+-+

1st Media Format
       media      port           IANA proto   no. of attributes
       +-+-+-+-+-+-+-+-+-+-+-+-+-+-+-+-+-+-+-+-+-+-+-+-+-+-+-+-+-+-+-+
41 →   | 001 | 11000000 00010110 |   0000 0001 | 00001             |
       +-+-+-+-+-+-+-+-+-+-+-+-+-+-+-+-+-+-+-+-+-+-+-+-+-+-+-+-+-+-+-+

Attribute Format
       IANA no  IANA attr          Clock Rate
       +-+-+-+-+-+-+-+-+-+-+-+-+-+-+-+-+-+-+-+-+-+-+-+-+-+-+-+-+-+-+-+
42 →   | 1000 | 1001110 |            11111 01000000                |
       +-+-+-+-+-+-+-+-+-+-+-+-+-+-+-+-+-+-+-+-+-+-+-+-+-+-+-+-+-+-+-+

2nd Media Format
       media      port           IANA proto   no. of attributes
       +-+-+-+-+-+-+-+-+-+-+-+-+-+-+-+-+-+-+-+-+-+-+-+-+-+-+-+-+-+-+-+
43 →   | 010 | 11000000 00010010 |   0000 0001 | 00001             |
       +-+-+-+-+-+-+-+-+-+-+-+-+-+-+-+-+-+-+-+-+-+-+-+-+-+-+-+-+-+-+-+

Attribute Format
       IANA no  IANA attr          Clock Rate
       +-+-+-+-+-+-+-+-+-+-+-+-+-+-+-+-+-+-+-+-+-+-+-+-+-+-+-+-+-+-+-+
44 →   | 001 | 00011011 |          10101111 110010000              |
       +-+-+-+-+-+-+-+-+-+-+-+-+-+-+-+-+-+-+-+-+-+-+-+-+-+-+-+-+-+-+-+
```

METHODS AND DEVICES FOR NEGOTIATING SESSION DESCRIPTOR PARAMETERS

CROSS REFERENCE TO RELATED APPLICATION

This application is a 35 U.S.C. § 371 national stage application of PCT International Application No. PCT/SE2014/051343, filed on Nov. 12, 2014, the disclosure and content of which is incorporated by reference herein in its entirety.

TECHNICAL FIELD

The technology disclosed herein relates generally to the field of data communication, and in particular to data communication comprising negotiation of parameters within constrained networks.

BACKGROUND

Internet of Things (IoT) refers to the interconnection of various devices with Internet. The devices are used within a wide variety of applications, for instance temperature monitoring, surveillance, automobile applications, motion sensor, etc. Typically, an IoT environment, also denoted machine-to-machine (M2M) environment, comprises multiple such devices operating for different purposes. These devices are often are constrained in some manner, e.g. being battery constrained, having limited connectivity, constrained in view of processing capacity, etc.

In some scenarios the devices will stream media to or from another device. For instance, a user may have a surveillance system set up and uses a computer for receiving media streams over the Internet from a surveillance camera. In such cases, the device (surveillance camera in this case) must negotiate a set of media parameters with the computer before sending the media stream. Otherwise the media might not be understood by the computer. Examples of media parameters comprise type of codecs used to compress or decompress the media streams and sampling frequency or bit-rate of that codec.

Session Description Protocol (SDP) is a format used in a majority of the applications for negotiating the media parameters between different peers. SDP is intended to be a general purpose format enabling it to be used in a wide range of applications. SDP is a text-based protocol and is purely a format for session descriptions, it does not incorporate a transport protocol and is instead intended for use with different transport protocols.

Currently, some of the most widely used transport protocols for SDP are Session Initiation Protocol (SIP) and Hypertext Transfer Protocol (HTTP) through JavaScript Session Exchange Protocol (JSEP).

The SIP is a signaling communication protocol used for controlling multimedia communication sessions such as voice and video calls over Internet Protocol (IP) networks. SIP can be used for establishing, modifying and terminating sessions comprising one or several media streams. SIP can be used for two-party (unicast) sessions or multiparty (multicast) sessions. In addition, SIP can be used for instance for video, audio conferencing, streaming, instant messaging, presence and online games.

JSEP is widely used to enable real-time communication between web browsers. JSEP is based on JavaScript and it provides a mechanism to exchange session information in the form of SDP binary large objects (SDP blobs). As a result, JSEP uses SDP as the format for its session negotiation. JSEP runs over the HTTP protocol.

SIP and JSEP are versatile protocols. While SIP has been used for many years in a large number of telecommunication applications, JSEP has been adopted by major browsers like Internet Explorer, Firefox, Google Chrome and Opera as the protocol to exchange media information with browsers. SIP and JSEP have served properly as carriers for SDP for many years and SDP has been meeting the requirements for the telecommunication and web industry during all these years.

The SDP has thus been carried in a number of different protocols, among which SIP and HTTP are two of the most used protocols.

SIP has been widely accepted as the natural choice of communication protocol for voice over IP (VoIP) applications, and has for many years been accepted as the industrial standard for media negotiation. On the other hand, JSEP has been carried using HTTP and has been accepted as the web standard for media negotiation.

However, SIP, JSEP and HTTP all have some limitations for use in constrained networks. For instance, they duplicate information in their header and payload which tend to make the SIP, HTTP and JSEP packets size large, and in particular too large for IoT applications. For example, an average SIP INVITE message may be 700 bytes or more in length, a SIP OK message, which is one of the smallest SIP messages, is generally 200-700 bytes in length, and an average SIP REGISTER message may be 350 bytes or more in length.

FIG. 1 shows an Institute of Electrical and Electronics Engineers (IEEE) 802.15.4 message and illustrates the size limitation of the IoT wireless technology. IEEE 802.15.4 is a radio technology for constrained devices. As illustrated in FIG. 1, the IEEE 802.15.4 payload 201 of the IEEE 802.15.4 message 200 is limited to 100 bytes. After including a 6LoWPAN header 203 (6LoWPAN is an acronym for IPv6 over Low power Wireless Personal Area Networks), which is 17 bytes and which already encapsulates the User datagram Protocol (UDP) header, the payload is significantly reduced to 83 bytes. Also illustrated is the MAC header 204 of the IEEE 802.15.4 message.

The size of all the SIP messages is too large e.g. for the IEEE 802.15.4 radio technologies. Even using compression algorithms such as Signaling Compression (SigComp), which at best achieves compression ratio of 22.3%, fails to be enough to reduce the SIP messages to a manageable packet size.

A conceivable way of solving the message overhead may be to fragment the packets, using for instance the Constrained Application Protocol (CoAP). Constrained networks use the CoAP as the application layer protocol. CoAP is a Representational state transfer (REST) binary protocol transported over User datagram Protocol (UDP) and it is designed to minimize the complexity of HTTP. A web service is said to be RESTful if it conforms to the constraints described in REST. CoAP provides a minimized way to transfer larger resource representations in a block-wise fashion.

Although presenting a possible solution, fragmentation decreases throughput of the network, decreases the performance e.g. in terms of bandwidth and increases the latency of the media negotiation, and thus of the service.

The performance of networks, particularly networks comprising constrained devices, can be detrimentally affected by these drawbacks that would be caused by fragmentation. The fragmentation might also overload the constrained devices unnecessarily. Other solutions to the message overhead are thus needed.

SUMMARY

An object of the present disclosure is to solve or at least alleviate at least one of the above mentioned problems.

The object is according to a first aspect achieved by a method performed in a first device for negotiating session descriptor parameters with a second device over an application layer protocol. The method comprises converting a value of a text based session descriptor parameter of a session description protocol, SDP, message into a binary format; encapsulating the converted SDP message into an application layer protocol message; and sending the application layer protocol message to the second device.

An advantage brought by the method is that a significantly reduced size of messages, in particular SDP messages, is enabled without causing loss of information. Another advantage is that the method prevents or at least reduces the risk of fragmentation in a media negotiation and reduces the latency in the media negotiation between devices that are constrained in any manner.

The object is according to a second aspect achieved by a first device for negotiating session descriptor parameters with a second device over an application layer protocol. The first device is configured to: convert a value of a text based session descriptor parameter of a session description protocol, SDP, message into a binary format; encapsulate the converted SDP message into an application layer protocol message; and send the application layer protocol message to the second device.

The object is according to a third aspect achieved by a computer program for a first device for negotiating session descriptor parameters with a second device over an application layer protocol. The computer program comprises computer program code, which, when executed on at least one processor on the first device causes the first device to perform the method as defined above.

The object is according to a fourth aspect achieved by a computer program product comprising a computer program as above and a computer readable means on which the computer program is stored.

The object is according to a fifth aspect achieved by a method performed in a second device for negotiating session descriptor parameters with a first device over an application layer protocol. The method comprises receiving, from the first device an application layer protocol message comprising a session description protocol, SDP, message; decapsulating the SDP message; and using a binary value of a session descriptor parameter of the SDP message in the negotiation or for the transmission of a media stream to the first device.

The object is according to a sixth aspect achieved by a second device for negotiating session descriptor parameters with a first device over an application layer protocol. The second device is configured to receive, from the first device an application layer protocol message comprising a session description protocol, SDP, message; decapsulate the SDP message; and use a binary value of a session descriptor parameter of the SDP message in the negotiation or for the transmission of a media stream to the first device.

The object is according to a seventh aspect achieved by a computer program for a second device for negotiating session descriptor parameters with a first device over an application layer protocol, the computer program comprising computer program code, which, when executed on at least one processor on the second device causes the second device to perform the method as above.

The object is according to an eight aspect achieved by a computer program product comprising a computer program as above and a computer readable means on which the computer program is stored.

Further features and advantages of the present disclosure will become clear upon reading the following description and the accompanying drawings.

BRIEF DESCRIPTION OF THE DRAWINGS

FIG. 1 illustrates an exemplary IEEE 802.15.4 packet.

FIG. 2 illustrates an exemplary SDP binary format according to an aspect of the present disclosure.

FIG. 3 illustrates an exemplary packet of the SDP binary format according to one aspect of the present disclosure.

DETAILED DESCRIPTION

Figure 4:
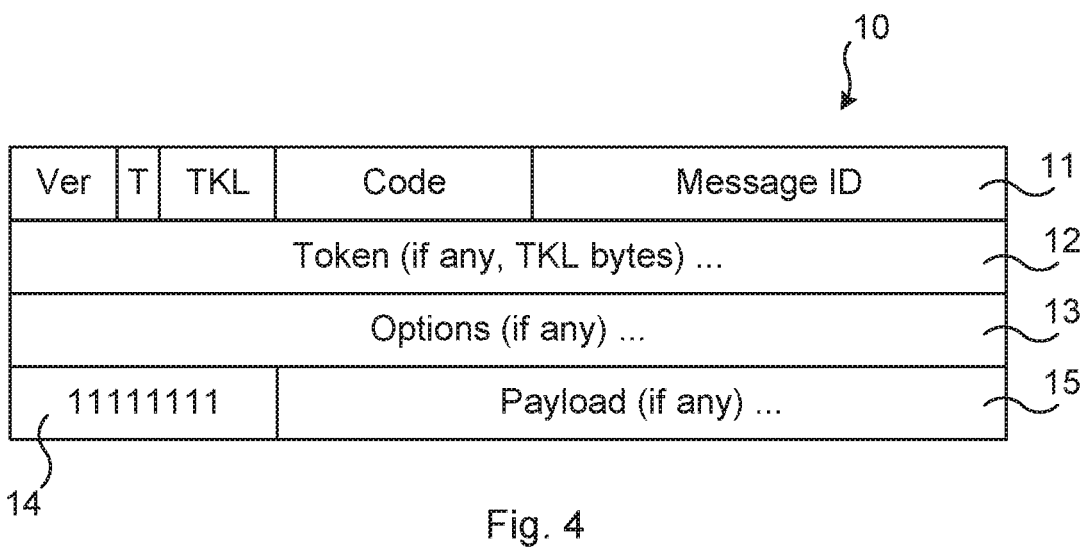
FIG. 4 illustrates a CoAP message format.

In the following description, for purposes of explanation and not limitation, specific details are set forth such as particular architectures, interfaces, techniques, protocols etc. in order to provide a thorough understanding. In other instances, detailed descriptions of well-known devices, circuits, and methods are omitted so as not to obscure the description with unnecessary detail. Same reference numerals refer to same or similar elements throughout the description.

As mentioned in the background section, several application protocols, such as SIP, JSEP and HTTP, all have some limitations for use in constrained networks. One aspect, pinpointed by the inventors of the present application, is that the protocols are text-based protocols. Their text-based approach has been identified by the inventors as a drawback, particularly in the context of constrained devices.

Similar to SIP, JSEP and HTTP, also SDP has a text-based format and even the smallest of the SDP message will easily surpass the limit of the IEEE 802.15.4 payload. For instance, the following exemplary and typical SDP message has a length of 244 bytes:
v=0
o=bob 2808844564 2808844564 IN IP4 host.biloxi.example.com
s=
c=IN IP4 host.biloxi.example.com
t=0 0
m=audio 49174 RTP/AVP 0
a=rtpmap:0 PCMU/8000
m=video 49170 RTP/AVP 32
a=rtpmap:32 MPV/90000

In this specific case, the binary SDP packet would need to be split in at least three IEEE 802.15.4 packets.

The Constrained Application Protocol (CoAP) is designed to easily translate to HTTP protocol, while also meeting specialized requirements such as multicast support, very low overhead, and simplicity. These features, i.e. multicast, low overhead, and simplicity are most important for Internet of Things (IoT) and Machine-to-Machine (M2M) devices. Therefore, CoAP is a good candidate application-layer protocol to be used in constrained devices and constrained networks.

In an aspect of the present disclosure, a solution is provided that comprises adapting SDP for negotiating media parameters over an application protocol, e.g. CoAP, in particular in negotiations with constrained devices. More specifically, a new binary SDP format is introduced. It is noted that although CoAp is used as an exemplary protocol to describe aspects of the present disclosure, in particular described as encapsulating the binary SDP format into CoAP, the binary SDP may alternatively be encapsulated with other application layer protocols. However, CoAP is designed for constrained networks and is, at present, the protocol used in the majority of the constrained networks. Thus, other transport protocols may be used, which could encapsulate the binary SDP format according to an aspect of the present disclosure without any or with minor modifications.

The present disclosure provides a light-weight protocol solution which significantly reduces the size of the messages, e.g. SDP messages, without loosing any information. In addition, the solution of the present disclosure prevents, or at least reduces the risk of fragmentation in the media negotiation and reduces the latency in the media negotiation between constrained devices.

In an aspect, the present disclosure provides a new, compact SDP format, in particular a binary SDP format, as opposite to text SDP format, for negotiating media in constrained networks.

In an aspect, the present disclosure describes how to encapsulate conventional text SDP format and the new binary SDP format into CoAP.

In the following, the new binary SDP format and its encapsulation into CoAP is described in more detail.

Binary Message Format

In e.g. a SIP session, SIP may use SDP for handling media within the session, media such as video, audio, text, application, messages etc. Basically, SDP is a protocol describing the media of a session. The SDP defines all media parameters that can be supported by a first device of the SIP session, which media parameters are then sent to a second device of the SIP session. The second device may then select one media parameter for use in a service to be provided.

In the following, the new and compact binary SDP format based on text SDP format is described. The binary SDP format is thus based on the conventional SDP (also denoted text SDP format herein) and converts the required session description information into a more space efficient binary format.

Conventional SDP defines a series of fields to describe a session description. Within an SDP message there are three main sections, detailing the session, timing, and media descriptions. Each message may contain one session description and multiple timing and media descriptions. The conventional SDP format comprises a series of <character>=<value>—lines, wherein <character> is an alphabetic character and <value> is structured text.

Optional values are specified with=* and each field must appear in the order shown below:

Session Description
v=(protocol version)
o=(originator and session identifier)
s=(session name)
i=* (session information)
u=* (Uniform Resource Identifier (URI) of description)
e=* (email address)
p=* (phone number)
c=* (connection information—not required if included in all media)
b=* (zero or more bandwidth information lines)
One or more time descriptions ("t=" and "r=" lines; see below)
z=* (time zone adjustments)
k=* (encryption key)
a=* (zero or more session attribute lines)
Zero or more media descriptions
Time Description
t=(time the session is active)
r=* (zero or more repeat times)
Media Description
m=(media name and transport address)
i=* (media title)
c=* (connection information—optional if included at session level)
b=* (zero or more bandwidth information lines)
k=* (encryption key)
a=* (zero or more media attribute lines)

The new binary SDP message may start with a fixed-size header followed by a set of variable-length values. In the new binary SDP format, the <value> of the <character>=<value>—lines is, instead of structured text, put in binary form.

In the following, the specific parameters needed for the new binary SDP format are described in more detail. The required (mandatory) parameters are v (protocol version), o (originator and session identifier), and m (media name and transport address):

v=(protocol version)—the new binary SDP may for instance define a 3-bits parameter to define the protocol version. By using three bits, eight different decimal values can be obtained, each decimal value defining a particular version. A correspondence table (described later) used for translating between text based SDP and the binary SDP may then correlate eight different versions expressed as text based SDP and binary SDP, respectively. It is noted that a higher or lower number of bits could alternatively be used, e.g. only 1 bit could be used, defining two decimal numbers.

o=(originator and session identifier)—this parameter has a set of subfields:
  username: is the user's login on the originating host.
  sess-id, is a numeric string that forms a globally unique identifier for the session. A Network Time Protocol (NTP) format timestamp may be used to ensure uniqueness.
  sess-version, is a version number for this session description. Again, an NTP format timestamp may preferably be used.
  nettype, is a text string giving the type of network. For instance, for an IoT environment the nettype will always be 'Internet'.
  addrtype, is a text string giving the type of the address that follows. Initially "IP4" and "IP6" are defined.
  unicast-address, is the address of the device from which the session was created.

Some of the above information may be omitted, such as nettype, and other information may be extracted from the lower layer headers such the addrtype and the unicast-address. The sess-id and the sess-version are required information and may, according to the present disclosure, be defined in 4 bytes.

The NTP format timestamp consist of 64-bit timestamps. The first 32-bits define seconds and the other 32-bits define fractional seconds. Thus, sess-id and the sess-version could take either the seconds or the fractional seconds as a parameter.

s=(session name)—the textual session name is, in an embodiment, not stored in the binary SDP format, i.e. is not converted.
  i=(session information), u=(URI of description), e=(email address), p=(phone number), c=(connection information), b=(zero or more bandwidth information lines), z=(time zone adjustments), k=(encryption key), r=(zero or more repeat times)—all these parameters are optional and are not absolutely required for a media negotiation.
  t=(time the session is active)—this parameter specifies the start and stop times for a session. The majority of the constrained networks will not support the capability of holding the session for later; the constrained hardware of the device and sleeping partners (awakening only occasionally) might make such option difficult. Thus, it could be assumed that the session will start as soon as possible. Consequently, this parameter is, in some embodiments, not stored in the new binary SDP format.
  m=(media name and transport address)—A session description may contain a number of media descriptions. A media field has several sub-fields:
    media: is a media type. The Internet Assigned Numbers Authority (IANA) media registers at least the media types "audio", "video", "text", "application", and "message", and also "image".
    port: is the transport port to which the media stream is sent and received
    proto: is the transport protocol.
    fmt: it is a media format description. The fmt references a media type describing the format under the attribute ("a=" fields).

The five IANA values of the media type (audio, video, text, application and message) can, according to the present disclosure, be represented using only 3 bits. This is accomplished by instead of using the text based session descriptor parameter "audio", a binary form of the parameter is used according to an aspect of the present disclosure.

For example, a correspondence table may be set up and stored, e.g. according to:

Audio=1
Video=2
Text=3
Application=4
Message=5 which when encoded to binary form would require significantly less bits. For instance, "audio" requires 5 bytes (40 bits), while decimal "1" only requires three bits.

The port can be represented with 2 bytes and all the possible parameters of the proto sub-field are registered in the IANA and can, again according to the present disclosure, be represented within a single byte (1 byte). The parameters being registered in the IANA facilitates in that a correspondence table may be easily set up, following the IANA table. For instance, IANA registers the following values:

| Type | SDP Name |
| --- | --- |
| proto | RTP/AVP |
| proto | udp |
| proto | vat |
| proto | rtp |
| proto | udptl |
| proto | TCP |
| proto | RTP/AVPF |
| proto | TCP/RTP/AVP |

The above is an incomplete extract from RFC 4566 provided in order to explain aspects of the present disclosure. From the above a correspondence table may be built, assigning each SDP name also e.g. a decimal value. This provides an efficient means for translation between text SDP format and binary SDP format.

A media description may have any number of attributes ("a=" fields). All the attributes from a media session can be contained after the media description field.

a=(zero or more session attribute lines)—the attribute parameter is defined as "attribute" and "value" or only "attributes". The values of the "attribute" are already registered in IANA (see e.g. RFC 4566). The media types of the "value" parameter are also registered in IANA. However, the "clock rate" needs to be defined using 2 bytes.

FIG. 2 shows a representation of the new binary SDP format. The new binary SDP format 30 comprises a new header 31 followed by a set of media names 32 ("m=" fields) with their corresponding attributes 33 ("a" fields). The "m"-field defines the media type, e.g. video, audio, and the transport port to which the media stream in question is sent and the transport protocol of that media (e.g., Real-time Transport Protocol, RTP). The fourth and any subsequent sub-fields describe the format of the media and are described in the "a"-field. Each "a"-field is protocol specific and defines a different media encoding supported by the communicating device. In other words, "m" defines the channel that the device will use for sending the media and "a" defines the codecs used for that media.

The following example was given earlier, and is repeated here for convenience. The exemplary known SDP packet below (from RFC 4317) is in the following denoted SDP packet_text. The SDP packet_text comprises 244 bytes:

v=0
    o=bob 2808844564 2808844564 IN IP4 host.biloxi.example.com
    s=
    c=IN IP4 host.biloxi.example.com
    t=0 0
    m=audio 49174 RTP/AVP 0
    a=rtpmap:0 PCMU/8000
    m=video 49170 RTP/AVP 32
    a=rtpmap:32 MPV/90000

FIG. 3 illustrates the result if using the binary SDP format specified in the present disclosure is used instead of the above SDP packet_text for encoding the same information.

In the new binary SDP format packet 40, at least all mandatory fields are translated into binary form.

For instance, the "m=audio 49174 RTP/AVP 0" of the known SDP packet_text is according to the present disclosure translated into binary format and would thus look like: 001|11000000 0001011010000 0001|00001, as indicated in FIG. 3 at reference numeral 41. In this example "audio" is set equal to decimal value 1. Instead of converting the text "audio" (ASCII) into binary form (i.e. to 01100001 01110101 01100100 01101001 01101111), which would require 5 bytes, a pre-set decimal value is assigned to "audio". In this case "audio" is assigned "1" and is converted into binary form (i.e. 001), which requires only 3 bits. Correspondingly, the attribute of the first media format is in the SDP packet_text: "a=rtpmap:0 PCMU/8000". Using the concept of the present disclosure, this attribute would look like: 1000|1001110|11111 01000000, as indicated in FIG. 3 at reference numeral 42.

The second media format of the known SDP packet_text is "video", which when put in binary form would read 01110110 01101001 01100100 01100101 01101111, that is, again 5 bytes. The SDP packet according to the present disclosure instead assigns "video" for instance the decimal value of 2, which when put in binary form reads "010" (as indicated at reference numeral 43), which again requires only 3 bits. Reference numeral 44 indicates the attribute of the second media format.

The binary SDP packet 40 of FIG. 3 only needs 25 bytes to encode the same information as the known SDP packet_text. In this case, a single IEEE 802.15.4 packet may encapsulate all the SDP information instead of the at least three packets needed in the known SDP. Fragmentation is thus avoided, latency is reduced and throughput increased.

Media Negotiation in CoAP

The Constrained Application Protocol (CoAP) is a specialized web transfer protocol designed to be use in constrained networks. The majority of the constrained networks use CoAP as the transport protocol to exchange information. However, there is not any standardized way of supporting media negotiation over CoAP. The conventional media negotiation formats (such as SDP) are specified to be used over SIP or HTTP among other non-constrained transport protocols.

In the following, a method is described of encapsulating into CoAP the conventional SDP messages and the binary SDP messages described earlier; i.e. the integration of the media negotiation format in the CoAP protocol.

FIG. 4 illustrates a CoAP message format. As mentioned earlier, CoAP is based on the exchange of compact messages that, by default, are transported over UDP. CoAP messages are encoded in a simple binary format. The message format 10 starts with a fixed-size 4-byte header ii comprising Ver (version), T (Transaction), TKL (token length), code (code request) and message identification. This is followed by a variable-length Token value 12, which can be between 0 and 8 bytes long. Following these mandatory values, comes the optional Options field 13 with zero or more Options fields and the Payload Marker 14 and the payload 15.

There are two different ways of encapsulating the media negotiation messages (conventional SDP or binary SDP) in CoAP: attaching the messages in the payload or including them as an Option field.

Media Negotiation Message in the Payload

Adding the media negotiation messages in the CoAP payload does not require any modifications of the CoAP message. The message may be encapsulated as such into the CoAP message.

If the media negotiation message needs more than one CoAP packet to transmit all information, then CoAP may use the method defined in the 'Blockwise transfers in CoAP' specification (draft-ietf-core-block-65) to fragment the CoAP messages accordingly.

Media Negotiation Message in the Option Field

Figure 5:
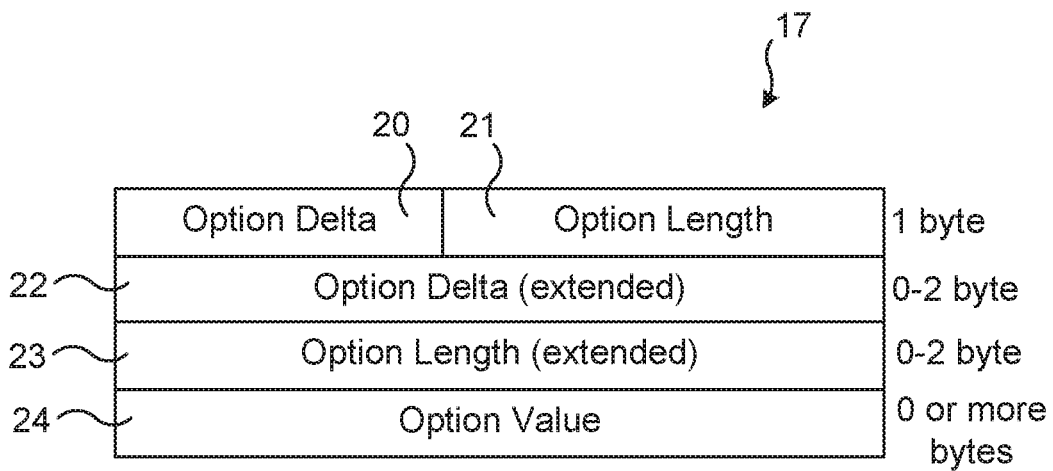
FIG. 5 illustrates a CoAP option format.

FIG. 5 illustrates the format of the Option field 13 of FIG. 4. The Option field 13 comprises:

Option Delta (reference numeral 20 of FIG. 5): identifies the option type, encoded as the delta (difference) to the previous option code.

Option Length (reference numeral 21 of FIG. 5): indicates the length of the Option Value, in bytes.

Option delta and option length together occupy 1 byte.

Option delta (extended), reference numeral 22, may comprise between 0 and 2 bytes, and option length (extended), reference numeral 23, may also comprise between 0 and 2 bytes.

Option Value (reference numeral 24 of FIG. 5): a sequence of exactly Option Length bytes.

CoAP defines a single set of options that are used in both requests and responses. Those options are Content-Type, Max-Age, Proxy-Uri, ETag, Uri-Host, Location-Path, Uri-Port, Location-Query, Uri-Path, Token and Uri-Query. The Constrained Application Protocol defines in section 5.10 of RFC 7252 all these options.

Figure 6:
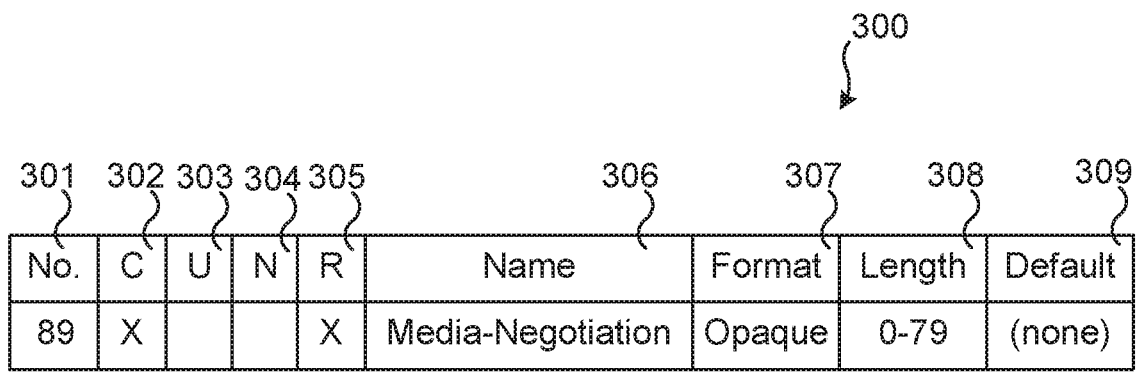
FIG. 6 illustrates an option definition according to one aspect of the present disclosure.

The present disclosure provides a new option definition for media negotiation, as illustrated in FIG. 6. The table of FIG. 6 follows the scheme of the table 4 of RFC 7252.

The table 300 defines the following values:

No. (reference numeral 301 of FIG. 6): identifies the option type, the value of this field can be any odd number apart from the numbers defined in IANA. The number 89 illustrated in FIG. 6 is merely an example, and other numbers could be used. Odd numbers indicate a critical option, and choosing an odd number for the media negotiation according to the present disclosure may be advantageous, since critical options are required in a CoAP message in order to be understood by the participating parties.

Critical (reference numeral 302 of FIG. 6): An option that would need to be understood by the negotiating part (endpoint) ultimately receiving the message in order to properly process the message.

Unsafe (reference numeral 303 of FIG. 6): An option that would not need to be understood by a proxy receiving the message in order to safely forward the message to a negotiating part.

NoCacheKey (reference numeral 304 of FIG. 6): An option that indicates that the proxy does not need to cache the message.

Repeatable (reference numeral 305 of FIG. 6): An option that is repeatable may be included one or more times in a message.

Name (reference numeral 306 of FIG. 6): the name of the option. The value of this field is illustrated as being "Media-negotiation", but other values could be used.

Format (reference numeral 307 of FIG. 6): An opaque sequence of bytes. That is, an inner structure is unknown and is expected to be treated by a program as a whole (store it, transmit it etc.) without interpreting it.

Length (reference numeral 308 of FIG. 6): the maximum and minimum length of the option. In the illustrated case, the length has been limited to 79 bytes since that is the maximum length before fragmentation is required in an IEEE 802.15.4 packet.

Default (reference numeral 309 of FIG. 6): this option is not a default option.

It is noted that, for the option definition for media negotiation provided by the present disclosure and illustrated in FIG. 6, the name, no. and length values as such are not important, they are merely provided as clarifying examples.

The media negotiation format (conventional SDP or binary SDP) is included inside the new option definition. Thus, the new media-negotiation option will include the whole message in the Option Value field (reference numeral 24 of FIG. 5).

Messaging Model

The CoAP messaging model is based on the exchange of messages over UDP between endpoints 50, 52.

Figure 7:
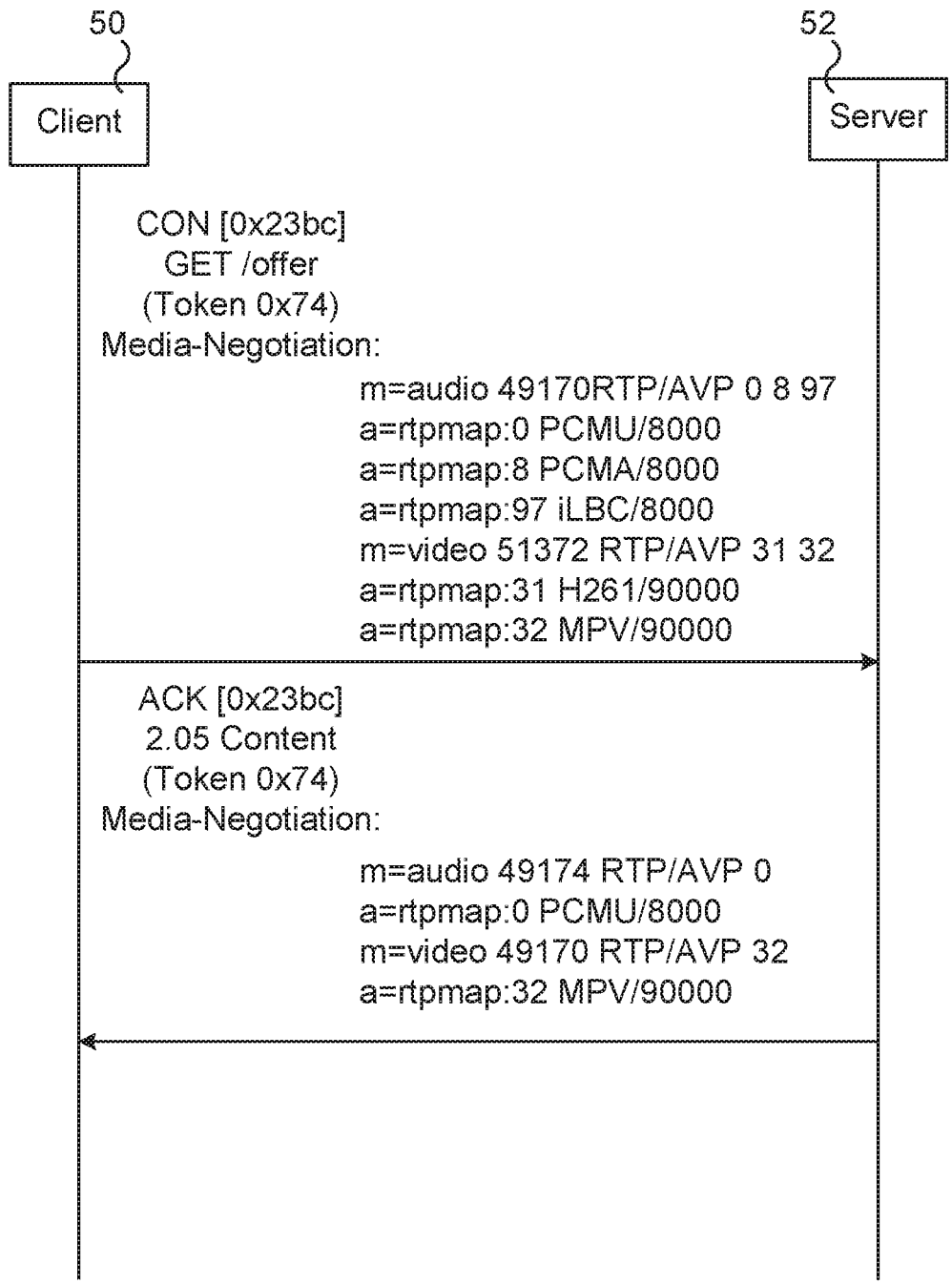
FIG. 7 is messaging model with SDP as an option.

FIG. 7 shows an example of media negotiation between a CoAP Client 50 and a CoAP Server 52. In this case, both the request and the response use the Media-Negotiation option method. The Media-Negotiation option, when present in a request, provides the SDP information to negotiate the media. As described earlier (under heading "Media negotiation in CoAP), the SDP could be attached to the Media-Negotiation option—as in FIG. 7—or as a payload.

FIG. 7 shows a common scenario in which multiple codecs for video and audio are offered by a client 50 but only one for each is accepted by a server 52. FIG. 7 illustrates a common scenario, and shows in particular a video and audio session in which multiple codecs are offered by the client 50 but only one is accepted by the server 52. As a result of the illustrated message exchange, both devices (server 52 and client 50) will communicate using only PCMU audio (offered by client 50 and accepted by server 52) and MPV video (again, offered by client 50 and accepted by server 52). In the example, the client 50 offers three different audio codecs and two different video-codecs (as defined in the "a="-fields following "m=audio"-fields) and the server 52 picks one for use. The illustrated scenario uses the conventional text based SDP, which is very inefficient for instance in case the client is a constrained device. If instead using the disclosed binary SDP format in the illustrated negotiation, the size of the messages is greatly reduced.

The request is carried in a Confirmable (CON) message. The response to a request carried in a Confirmable message is carried in the resulting Acknowledgement (ACK) message. The response message includes the 2.05 (Content) response code and the SDP response in the Media-Negotiation option.

Although FIG. 7 illustrates the use of the GET method, embodiments of the present disclosure could use any other method instead, such as a PUT or POST method. In addition, the response message need not be entitled to the 2.05 (Content) response code only, other response codes such as 2.01 (Created) or 2.03 (Valid) could be valid options as well.

SDP Cross-Protocol Translation

The new binary SDP format easily translates to the conventional SDP text format, as has been mentioned earlier and exemplified by the correspondence tables. This enables the embodiments of the present disclosure to be easily integrated with other non-constrained network services, devices and networks.

In some embodiments, the binary SDP format defined and described herein supports a limited subset of the SDP functionality only, for instance, it may be implemented to not support the optional SDP parameters. Thus, cross-protocol translation from the binary SDP to the text-based SDP is straightforward.

Likewise, the transformation between the text-based SDP format to the binary SDP format may easily be done but some of the optional information might be lost. In embodiments of the present disclosure, only the mandatory parameters are translated into binary data. That is enough to establish a media negotiation session between the peers. The optional information is not required for this negotiation and are omitted from the binary SDP, since the binary SDP is trying to reduce the amount of SDP information sent by the devices. An advantage is that the constrained devices does not waste its capabilities sending information which is not crucial for the communication.

Figure 8:
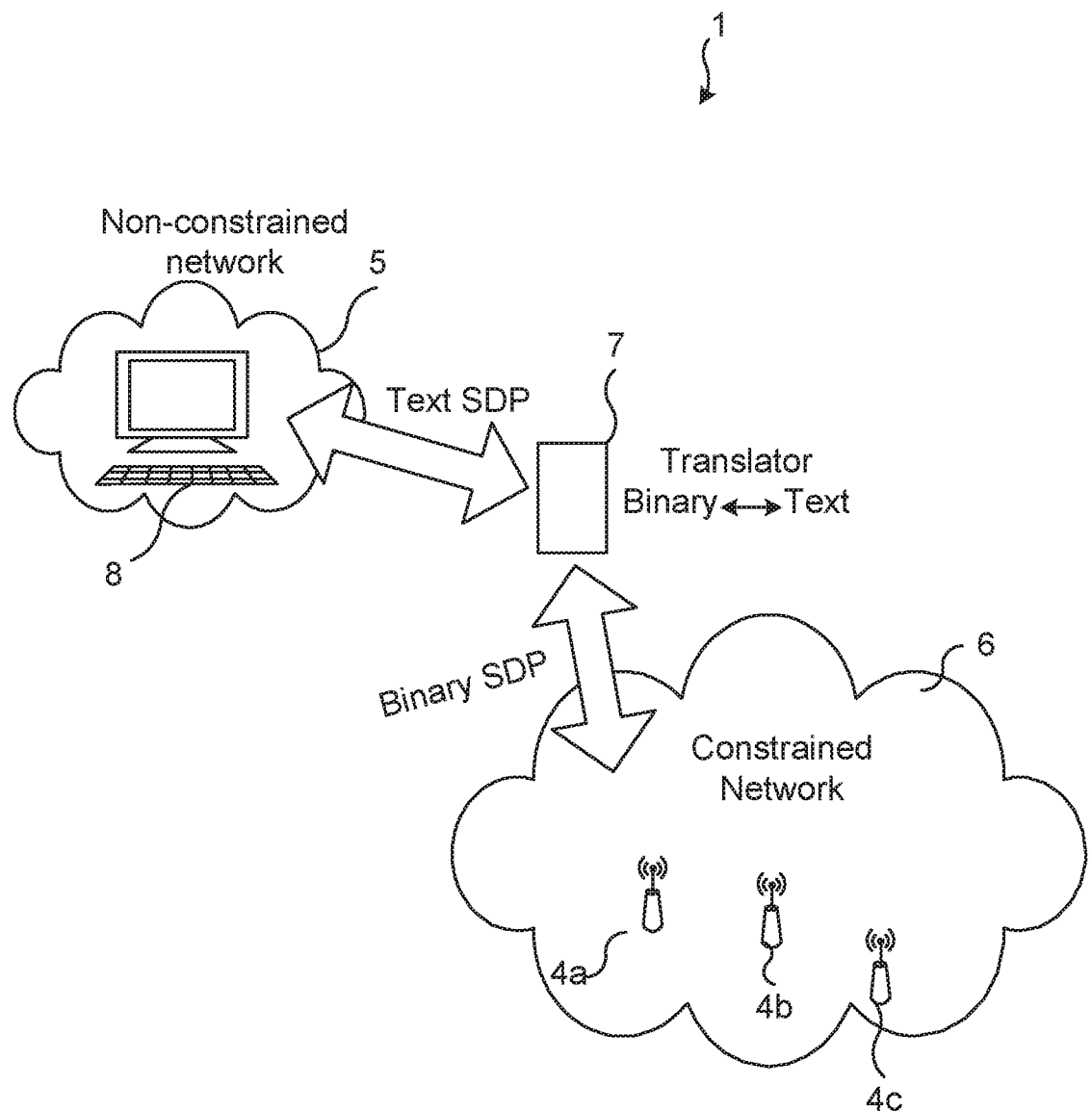
FIG. 8 illustrates an exemplary environment in which embodiments of the present disclosure may be implemented.

FIG. 8 illustrates an environment 1 in which embodiments of the present disclosure may be implemented. A constrained network 6 comprising constrained devices 4*a*, 4*b*, 4*c* is illustrated. The constrained network 6 may for instance comprise a Low-Power Wireless Personal Area Network (LoWPAN) or ZigBee. Examples of constrained devices 4*a*, 4*b*, 4*c* of such constrained network 6 comprise sensor devices, e.g. sensing a parameter such as for instance temperature, surveillance devices (e.g. cameras), motion sensors, actuators, chemical sensors, automotive sensors (e.g. measuring air-fuel ratio, defects of car parts, blind spot monitor), proximity sensors etc. As indicated earlier, such constrained devices may be constrained in one or more aspects: they may be battery operated and hence energy constrained and/or requiring battery replacements, they may have limited connectivity, e.g. in terms of communication range, transmission power, communication scheme, e.g. entering energy saving modes and awakening only periodically for communication etc., and/or they may be constrained in view of their available processing capacity, etc.

A non-constrained network 5 is also illustrated, comprising a user device 8 such as a computer. A computer for instance, is typically non-constrained in view of energy supply (can be plugged into a wall outlet), processing capacity (often very good) and connectivity (may be connected by means of cable).

A user of the computer 8 may use a surveillance application and stream video and/or audio from a constrained device 4*a*, e.g. comprising a camera. In an exemplary scenario, the camera 4*a* has the improved SDP protocol according to the present disclosure in its protocol stack, and wants to upload media to the computer 8, which only has the conventional text SDP format. A translation between the text SDP format and the binary SDP format is thus required. This may for instance be accomplished by an intermediate device 7 such as a server performing the translation. In other embodiments, the user device 8 (computer in this example) incorporates such translation means. In some embodiments only the constrained devices 4a, 4b, 4c comprises the binary SDP format protocol, while non-constrained devices 8 use conventional SDP protocol, and a translation them between (as indicated in FIG. 8 by large arrows) is effectuated. This may be effectuated in the user device 8 or in some other device 7 before further transmission to the user device 8.

Figure 9:
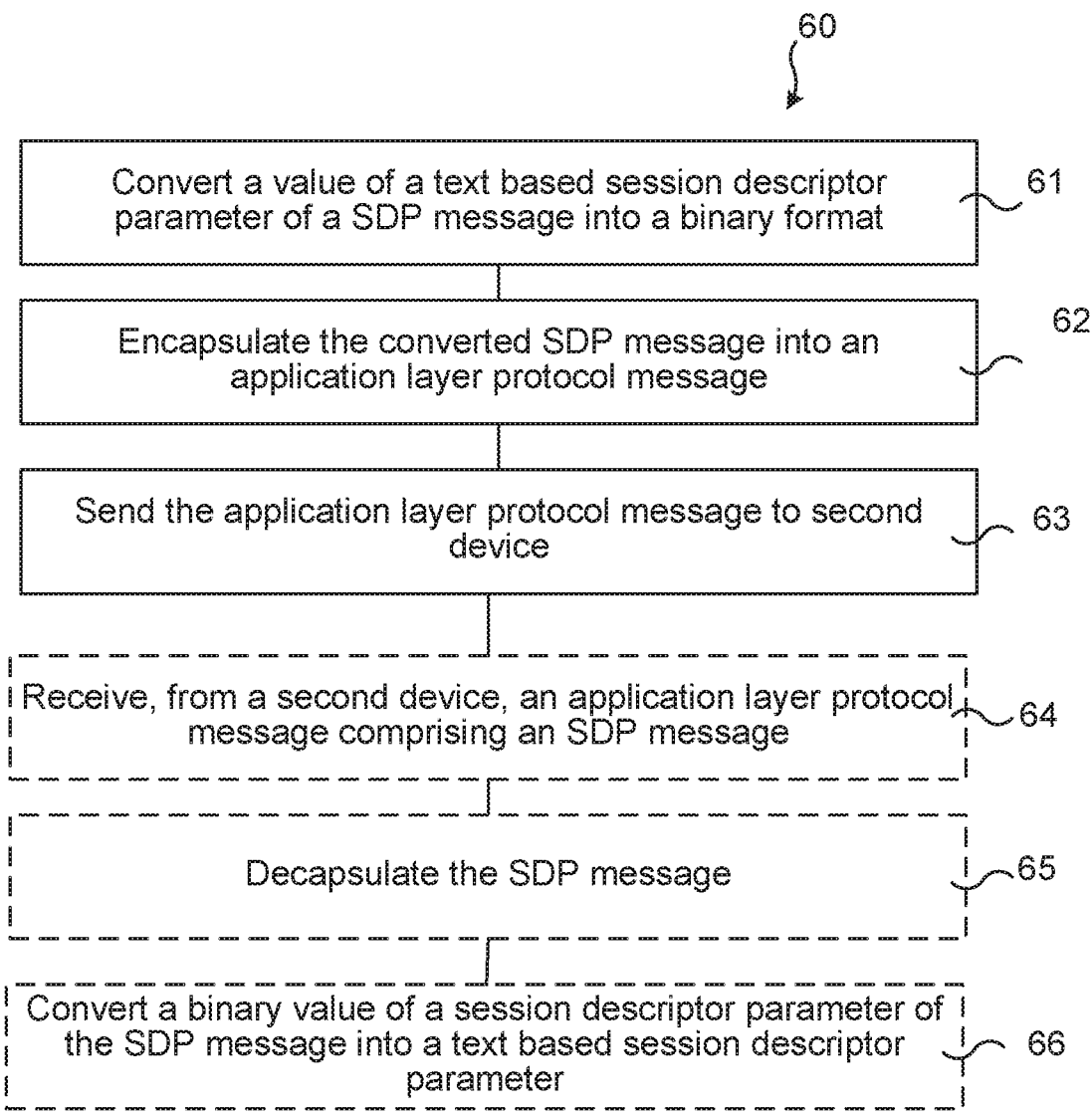
FIG. 9 illustrates a flow chart over steps of a method in a device in accordance with the present disclosure.

The various features that have been described may be combined in different ways, examples of which are given next with reference to FIG. 9.

FIG. 9 illustrates a flow chart over steps of a method in a device in accordance with the present disclosure. The method 60 may be used for negotiating session descriptor parameters between devices. The method 60 may be implemented in a first device 7, 8, 52, e.g. in a non-constrained device 8 negotiating session parameters with a constrained device 4a, 4b, 4c, 50. However, it is noted that the method 60 may be implemented in either or both ends that are negotiating media parameters. For instance, the method 60 may be implemented in a constrained device 4a, 4b, 4c and/or in a translator device 7 and/or in a device 8 of a non-constrained network 5.

A method 60 performed in a first device 7, 8, 52 for negotiating session descriptor parameters with a second device 4a, 4b, 4c, 50 over an application layer protocol is provided. The method 60 comprises converting 61 a value of a text based session descriptor parameter of a session description protocol, SDP, message into a binary format.

The method 60 comprises encapsulating 62 the converted SDP message into an application layer protocol message.

The method 60 comprises sending 63 the application layer protocol message to the second device 4a, 4b, 4c, 50.

Several advantages are brought by the method 60. The method 60 enables a drastic reduction of the size of the messages during session management, session negotiation and session termination, avoiding, in many cases, fragmentation of the packets. The method reduces significantly latency during the session management, session negotiation and session termination and provides improved quality of service. The method 60 optimizes bandwidth use in a communication and increases the throughput of the network, in particular in case of a constrained network. The method 60 provides a better alternative for media negotiation in constrained networks than the existing ones, i.e. SIP or WebRTC. All important information is kept, i.e. not lost, for media negotiation among constrained devices.

In an embodiment, the converting 61 comprises obtaining a binary value corresponding to the value of the text based session descriptor parameter from a table. A correspondence table, described earlier, may for instance be used. In particular, the first device 7, 8, 52 may obtain the binary value corresponding to the value of the text based session descriptor parameter by retrieving it or receiving it from a correspondence table. In other embodiments, the first device 7, 8, 52 may obtain the binary value corresponding to the value of the text based session descriptor parameter by performing a conversion determination procedure.

In an embodiment, the converting 61 comprises converting only values of mandatory session descriptor parameters into binary format. The translations between the binary SDP format and the conventional text SDP format may thus be kept to a minimum. This embodiment provides advantages such as for instance less memory usage in the constrained devices, less central processing unit (CPU) load in the constrained devices, less battery consumption. A significant reduction of latency in the media management is also achieved, as is an optimization of the bandwidth in the constrained network.

In an embodiment, the encapsulating 62 comprises encapsulating the converted SDP message into a constrained application protocol, CoAP, message.

In a variation of the above embodiment, the converted SDP message is encapsulated in a payload of the CoAP message or in an option field of the CoAP message.

In an embodiment, the SDP message is encapsulated in a single packet. Fragmentation is thus avoided and latency reduced. The packet may for instance be a packet of a constrained network type, such as a IEEE802.15.4 packet.

In a variation of the above embodiment, the packet is a packet of a constrained network communication. The method 60 is very valuable in such constrained network communication, e.g. by requiring reduced processing capacity, and requiring reduced battery consumption of the constrained devices.

In an embodiment, the method 60 comprises:
receiving 64, from the second device 4a, 4b, 4c, 50 an application layer protocol message comprising an SDP message,
decapsulating 65 the SDP message, and
converting 66 a binary value of a session descriptor parameter of the SDP message into a text based session descriptor parameter.

The translation, or conversion, of a value of a text based session descriptor parameter of a session description protocol, SDP, message into a binary format, and the other way around may be performed in a single device. The boxes 64, 65, 66 of FIG. 9 are drawn with dashed lines to indicate that they are optional, i.e. merely an embodiment.

In a variation of the above embodiment, the converting 66 comprises obtaining the text based session descriptor parameter corresponding to the binary value from a table. A single correspondence table may be used to translate between the binary SDP format and the conventional text SDP format. In some instances and embodiments, the value of the text based session descriptor parameter may be converted into a binary format comprising only a 3 bit binary value. Such 3 bit binary value may correspond to a decimal numerical value, wherein the decimal numerical value in turn corresponds to an entry of a table comprising the value of the text based session descriptor.

In an embodiment, the method 60 comprises, before the converting 61, receiving an application layer protocol message comprising a session description protocol message from a third device 7, for establishing a media negotiating with the second device 4a, 4b, 4c, 5o. An intermediate device 7 may thus be used that performs the translation (conversion), which is advantageous e.g. if two constrained devices 4a, 4b, 4c are the communicating parties.

In an embodiment, the method 60 comprises receiving and/or sending a media stream using the negotiated session descriptor parameters.

In various embodiments, the text based session descriptor parameters that are converted comprises a Session Description Protocol, SDP, parameter, in particular one or more of: session description parameter, a timing parameter and media description parameter; and wherein the value of the text based session descriptor parameter comprises one or more of: audio, video, text, application, message, image, protocol version.

Figure 10:
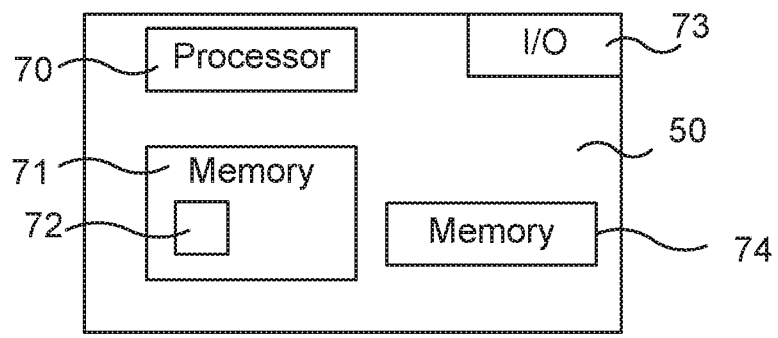
FIG. 10 illustrates schematically a device and means for implementing embodiments of the methods of the present disclosure.

FIG. 10 illustrates schematically a device and means for implementing embodiments of the methods of the present disclosure. The various embodiments of the method 60 as described e.g. in relation to FIG. 9 may for instance be implemented in a first device 7, 8, 52.

The first device 7, 8, 52 comprises a processor 70 comprising any combination of one or more of a central processing unit (CPU), multiprocessor, microcontroller, digital signal processor (DSP), application specific integrated circuit etc. capable of executing software instructions stored in a memory 71, which can thus be a computer program product 71. The processor 70 can be configured to execute any of the various embodiments of the method for instance as described in relation to FIG. 9.

The memory 71 can be any combination of read and write memory (RAM) and read only memory (ROM), Flash memory, magnetic tape, Compact Disc (CD)-ROM, digital versatile disc (DVD), Blu-ray disc etc. The memory 71 also comprises persistent storage, which, for example, can be any single one or combination of magnetic memory, optical memory, solid state memory or even remotely mounted memory.

A data memory 74 may also be provided for reading and/or storing data during execution of software instructions in the processor 70. The data memory 74 can for instance be any combination of random access memory (RAM) and read only memory (ROM).

The first device 7, 8, 52 may also comprise an input/output device 73, indicated by I/O in FIG. 10. The input/output device 73 may comprise an interface for communication exchange for instance with other network nodes 7 and/or other entities of the constrained network 6 and/or non-constrained network 5.

A first device 7, 8, 52 is provided for negotiating session descriptor parameters with a second device 4a, 4b, 4c, 50 over an application layer protocol. The first device 7, 8, 52 is configured to:

convert a value of a text based session descriptor parameter of a session description protocol, SDP, message into a binary format, encapsulate the converted SDP message into an application layer protocol message, and send the application layer protocol message to the second device 4a, 4b, 4c, 50.

The first device 7, 8, 52 may be configured to perform the above steps e.g. by comprising a processor 70 and memory 71, the memory 71 containing instructions executable by the processor 70, whereby the first device 7, 8, 52 is operative to perform the steps.

In an embodiment, the first device 7, 8, 52 is configured to convert by obtaining a binary value corresponding to the value of the text based session descriptor parameter from a table.

In an embodiment, the first device 7, 8, 52 is configured to convert only values of mandatory session descriptor parameters into binary format.

In an embodiment, the first device 7, 8, 52 is configured to encapsulate the converted SDP message into a constrained application protocol, CoAP, message.

In a variation of the above embodiment, the first device 7, 8, 52 is configured to encapsulate the converted SDP message in a payload of the CoAP message or in an option field of the CoAP message.

In an embodiment, the first device 7, 8, 52 is configured to encapsulate the SDP message in a single packet.

In an embodiment, the packet is a packet of a constrained network communication.

In an embodiment, the first device 7, 8, 52 is configured to:

receive, from the second device 4a, 4b, 4c, 50 an application layer protocol message comprising an SDP message, decapsulate the SDP message, and convert a binary value of a session descriptor parameter of the SDP message into a text based session descriptor parameter.

In a variation of the above embodiment, the first device 7, 8, 52 is configured to convert by obtaining from a table the text based session descriptor parameter corresponding to the binary value.

In an embodiment, the first device 7, 8, 52 is configured to, before the converting, receive an application layer protocol message comprising a session description protocol message from a third device 8, for establishing a media negotiating with the second device 4a, 4b, 4c, 50.

In an embodiment, the first device 7, 8, 52 is configured to receive and/or send a media stream using the negotiated session descriptor parameters.

The present disclosure also encompasses a computer program product 71 comprising a computer program 72 for implementing the embodiments of the method as described, and a computer readable means on which the computer program 72 is stored. The computer program product 71 may, as mentioned earlier, be any combination of random access memory (RAM) or read only memory (ROM), Flash memory, magnetic tape, Compact Disc (CD)-ROM, digital versatile disc (DVD), Blu-ray disc etc.

The present disclosure thus comprises a computer program 72 for a first device 7, 8, 52 for negotiating session descriptor parameters with a second device 4a, 4b, 4c, 50 over an application layer protocol. The computer program 72 comprises computer program code, which, when executed on at least one processor on the first device 7, 8, 52 causes the first device 7, 8, 52 to perform the method 60 as has been described. The binary SDP protocol of the present disclosure may be implemented as a computer program and is designed to be easy to translate into (and from) the conventional SDP. A binary SDP message is also provided comprising a session descriptor comprising at least one field, wherein at least one value of the field of the session descriptor is in binary format.

A computer program product 71 comprising a computer program 72 as above and a computer readable means on which the computer program 72 is stored is also provided. The computer program product, or the memory, comprises instructions executable by the processor 70. Such instructions may be comprised in a computer program, or in one or more software modules or function modules.

Figure 11:
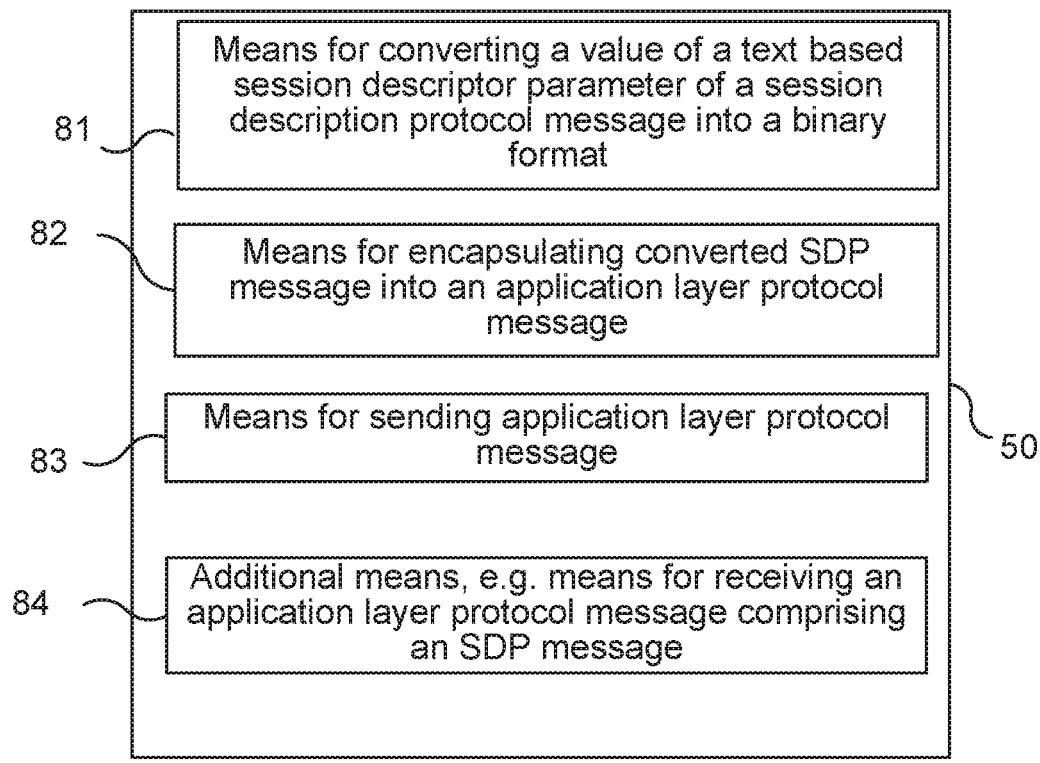
FIG. 11 illustrates a device comprising function modules/software modules for implementing embodiments of the methods of the present disclosure.

FIG. 11 illustrates an example of an implementation of the device using function modules/software modules. In particular, figure ii illustrates a device (e.g. first device 7, 8, 52) comprising function modules for implementing embodiments of the method of the present disclosure.

The device comprises first means 81 for converting a value of a text based session descriptor parameter of a session description protocol, SDP, message into a binary format. The first means 81 may comprise processing circuitry adapted to perform such conversion by using program code stored in a memory.

The device comprises second means 82 for encapsulating the converted SDP message into an application layer protocol message. The second means 82 may comprise processing circuitry adapted to perform such encapsulation by using program code stored in a memory.

The device comprises third means 83 for sending the application layer protocol message to the second device 4a, 4b, 4c, 50. The third means 83 may comprise processing circuitry adapted to perform such transmission by using program code stored in a memory and/or by using a stack of protocols.

The first device 7, 8, 52 may comprise still further means for implementing the various features of the method as have been described. For instance, the first device 7, 8, 52 may comprise additional means 84, for receiving, from the second device 4a, 4b, 4c, 50 an application layer protocol message comprising an SDP message. Such additional means 84 may for instance comprise processing circuitry adapted to perform such reception by using program code stored in a memory and/or by using a stack of protocols.

The first device 7, 8, 52 may comprise means (not explicitly illustrated in the FIG. 11) for decapsulating the SDP message. Such means may for instance comprise processing circuitry adapted to perform such decapsulating by using program code stored in a memory.

The first device 7, 8, 52 may comprise means (not explicitly illustrated in the FIG. 11) for converting a binary value of a session descriptor parameter of the SDP message into a text based session descriptor parameter. Such means may for instance comprise processing circuitry adapted to perform such conversion by using program code stored in a memory.

The first, second and third means 81, 82, 83, and any additional optional means indicated schematically at reference numeral 84, e.g. function modules, can be implemented using software instructions such as computer program executing in a processor and/or using hardware, such as application specific integrated circuits, field programmable gate arrays, discrete logical components etc., and any combination thereof.

Figure 12:
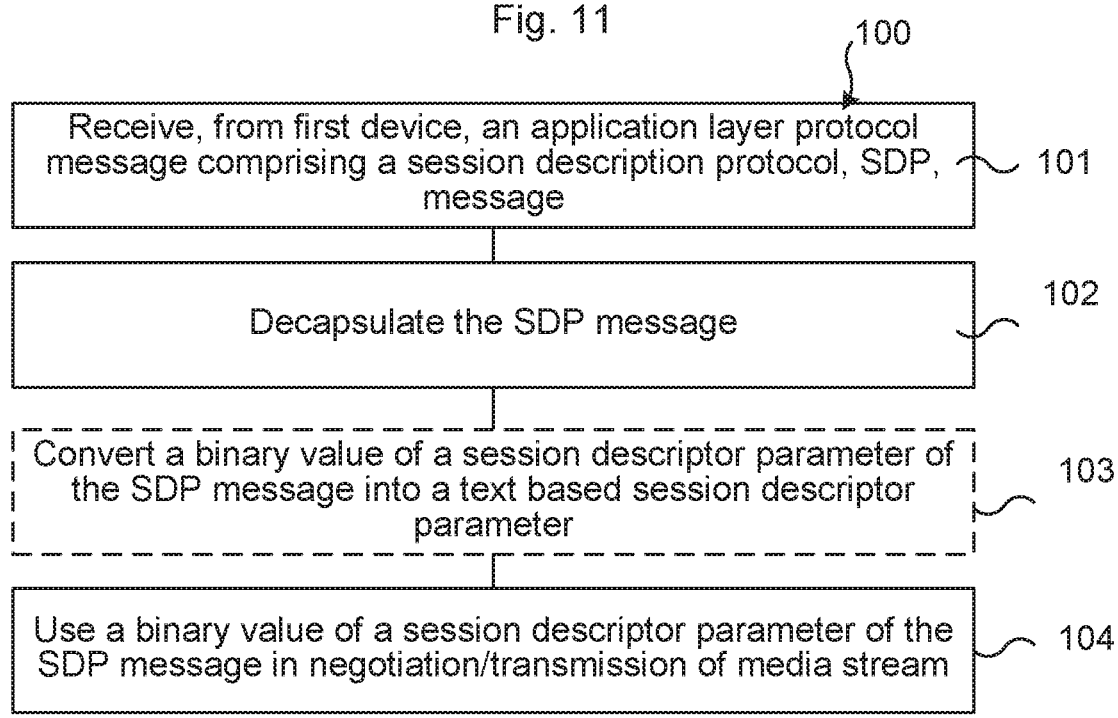
FIG. 12 illustrates a flow chart over steps of a method in a device in accordance with the present disclosure.

FIG. 12 illustrates a flow chart over steps of a method in a device in accordance with the present disclosure. In an aspect, a method 100 performed in a second device 4a, 4b, 4c, 50 for negotiating session descriptor parameters with a first device 52 over an application layer protocol is provided. The method 100 comprises:

receiving 101, from the first device 7, 8, 52 an application layer protocol message comprising a session description protocol, SDP, message, decapsulating 102 the SDP message, and using 104 a binary value of a session descriptor parameter of the SDP message in the negotiation or for the transmission of a media stream to the first device 52.

In an embodiment, the method 100 comprises, before the using 104 the binary value, converting 103 the binary value of a session descriptor parameter of the SDP message into a text based session descriptor parameter. This is an optional step, indicated in FIG. 12 by a box 103 drawn with dashed lines.

The second device 4a, 4b, 4c, 50 may comprise a constrained device e.g. with limited processing capacity and battery supply. It may directly understand the binary information of the decapsulated SDP message and may select a session description parameter of the SDP message suggested in a negotiation, for use in media transmission to the first device 52, or in further negotiation. That is, without converting the information into the text based SDP.

In other embodiments, the constrained device 4a, 4b, 4c, 50 may first convert a binary value of a session descriptor parameter of the SDP message into a text based session descriptor parameter before using it in media transmission.

In an embodiment, the converting 103 comprises obtaining the text based session descriptor parameter corresponding to the binary value from a table.

Figure 13:
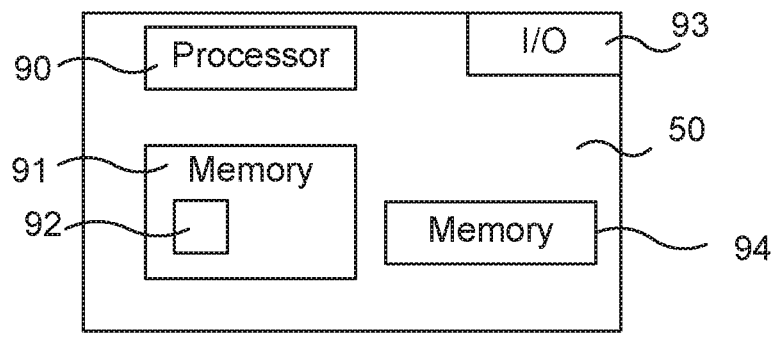
FIG. 13 illustrates schematically a device and means for implementing embodiments of the methods of the present disclosure.

FIG. 13 illustrates schematically a device and means for implementing embodiments of the methods of the present disclosure. The second device 50 comprises a processor 90 comprising any combination of one or more of a central processing unit (CPU), multiprocessor, microcontroller, digital signal processor (DSP), application specific integrated circuit etc. capable of executing software instructions stored in a memory 91, which can thus be a computer program product 91. The processor 90 can be configured to execute any of the various embodiments of the method for instance as described in relation to FIG. 12.

The memory 91 can be any combination of read and write memory (RAM) and read only memory (ROM), Flash memory, magnetic tape, Compact Disc (CD)-ROM, digital versatile disc (DVD), Blu-ray disc etc. The memory 91 also comprises persistent storage, which, for example, can be any single one or combination of magnetic memory, optical memory, solid state memory or even remotely mounted memory.

A data memory 94 may also be provided for reading and/or storing data during execution of software instructions in the processor 90. The data memory 94 can for instance be any combination of random access memory (RAM) and read only memory (ROM).

The second device 50 may also comprise an input/output device 93, indicated by I/O in FIG. 13. The input/output device 93 may comprise an interface for communication exchange for instance with other network nodes 7 and/or other entities of the constrained network 6 and/or non-constrained network 5.

A second device 4a, 4b, 4c, 50 is provided for negotiating session descriptor parameters with a first device 52 over an application layer protocol. The second device 4a, 4b, 4c, 50 is configured to:

receive, from the first device 7, 8, 52 an application layer protocol message comprising a session description protocol, SDP, message, decapsulate the SDP message, and use a binary value of a session descriptor parameter of the SDP message in the negotiation or for the transmission of a media stream to the first device 52.

It is noted that a constrained device may directly understand the binary information of the decapsulated SDP message, i.e. without converting the information into the text based SDP. The constrained device may then select a suggested session description parameter of the SDP message directly in the negotiation.

The second device 4a, 4b, 4c, 50 may be configured to perform the above steps e.g. by comprising a processor 90 and memory 91, the memory 91 containing instructions executable by the processor 90, whereby the second device 4a, 4b, 4c, 50 is operative to perform the steps.

In an embodiment, the second device 4a, 4b, 4c, 4d is configured to, before using the binary value, convert the binary value of a session descriptor parameter of the SDP message into a text based session descriptor parameter.

In an embodiment, the second device 4a, 4b, 4c, 50 is configured to convert by obtaining the text based session descriptor parameter corresponding to the binary value from a table.

The present disclosure thus comprises a computer program 92 for a second device 4a, 4b, 4c, 50 for negotiating session descriptor parameters with a first device 7, 8, 52 over an application layer protocol. The computer program 92 comprises computer program code, which, when executed on at least one processor on the second device 4a, 4b, 4c, 50 causes the second device 4a, 4b, 4c, 50 to perform the method 80 as has been described.

A computer program product 91 comprising a computer program 92 as above and a computer readable means on which the computer program 92 is stored is also provided. The computer program product, or the memory, comprises instructions executable by the processor 90. Such instructions may be comprised in a computer program, or in one or more software modules or function modules.

Figure 14:
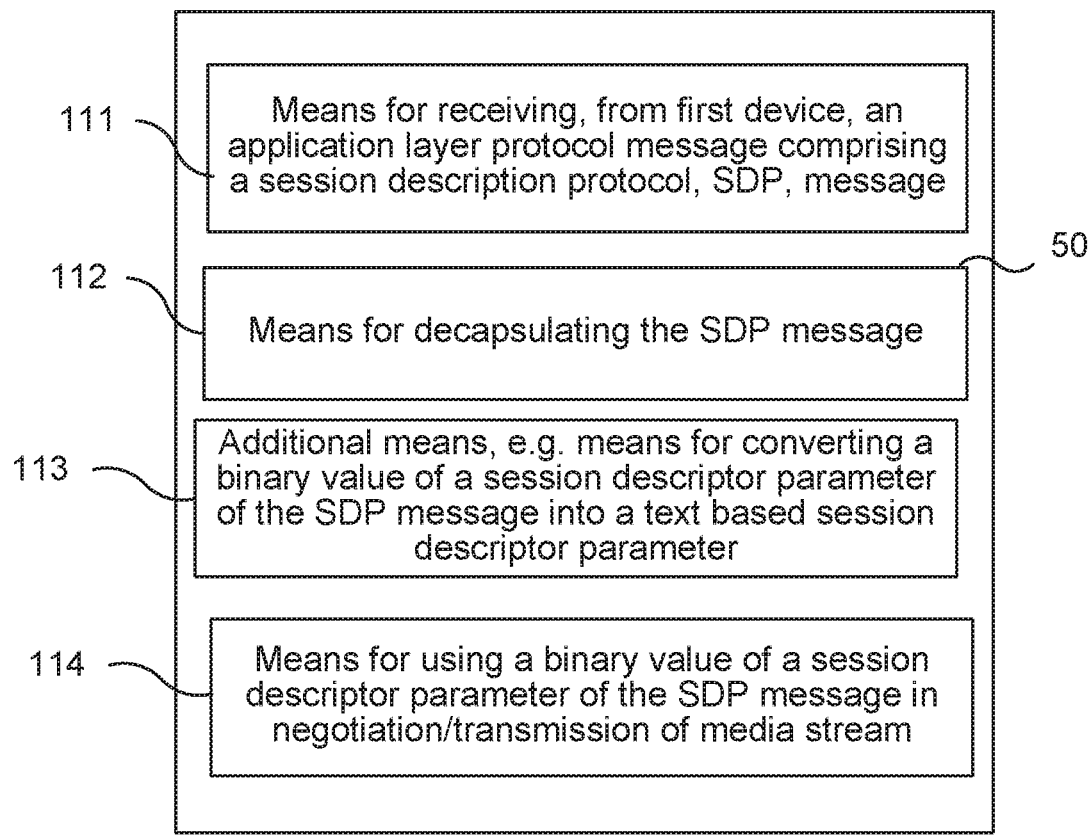
FIG. 14 illustrates a device comprising function modules/software modules for implementing embodiments of the methods of the present disclosure.

FIG. 14 illustrates an example of an implementation of the device using function modules/software modules. In particular, FIG. 14 illustrates a device (e.g. second device 4a, 4b, 4c, 50) comprising function modules for implementing embodiments of the method of the present disclosure.

The device comprises first means in for receiving, from the first device 7, 8, 52 an application layer protocol message comprising a session description protocol, SDP, message. The first means 111 may comprise processing circuitry adapted to perform such reception by using program code stored in a memory and/or by using a stack of protocols.

The device comprises second means 112 for decapsulating the SDP message. The second means 112 may comprise processing circuitry adapted to perform such decapsulation by using program code stored in a memory.

The device comprises third means 114 for using a binary value of a session descriptor parameter of the SDP message in the negotiation or for the transmission of a media stream to another device (e.g. the first device 52). Such may comprise processing circuitry adapted to perform such decapsulation by using program code stored in a memory, and/or processing circuitry for transmitting media streams to another node, e.g. via interfaces and/or cables.

The device may comprise still further means for implementing the various features of the method as have been described. For instance, the device may comprise means 113 for converting a binary value of a session descriptor parameter of the SDP message into a text based session descriptor parameter. The third means 103 may comprise processing circuitry adapted to perform such conversion by using program code stored in a memory.

The second device 4a, 4b, 4c, 50 may comprise still further means, not explicitly illustrated in FIG. 14, for implementing the various features of the method as have been described.

The first, second and third means 101, 102, 103 and any additional optional means, comprising e.g. function modules, can be implemented using software instructions such as computer program executing in a processor and/or using hardware, such as application specific integrated circuits, field programmable gate arrays, discrete logical components etc., and any combination thereof.

It is noted that the method 60 described in relation to FIG. 9 and the method 80 described in relation to FIG. 12 may be implemented in a single device.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a first device for negotiating session descriptor parameters with a second device over an application layer protocol, the method comprising:
responsive to the second device being a constrained device in a network where a size of a text based session descriptor parameter of a session description protocol (SDP) message is larger than an application layer protocol message payload size used in the network, converting a value of the text based session descriptor parameter of the session description protocol (SDP) message into a binary format to form a reduced-sized converted SDP message without any loss of information to be sent to the second device, wherein the value of the text based session descriptor parameter comprises a numerical value used to refer to the text based session descriptor parameter and the text based session descriptor parameter is a session descriptor parameter required to communicate with the second device, wherein converting the value of the text based session descriptor parameter for a subset of text based session descriptor parameters comprises replacing the value of the text based session descriptor in the SDP message with a binary value corresponding to the value of the text based session descriptor and converting the binary value into the binary format;
encapsulating the converted SDP message into an application layer protocol message; and
sending the application layer protocol message to the second device.

2. The method as claimed in claim 1, wherein the converting of the value comprises obtaining the binary value corresponding to the value of the text based session descriptor parameter from a table.

3. The method as claimed in claim 1, wherein the converting comprises converting only values of mandatory session descriptor parameters into binary format.

4. The method as claimed in claim 1, wherein the encapsulating comprises encapsulating the converted SDP message into a constrained application protocol, CoAP, message.

5. The method as claimed in claim 4, wherein the converted SDP message is encapsulated in a payload of the CoAP message or in an option field of the CoAP message.

6. The method as claimed in claim 1, wherein the SDP message is encapsulated in a single packet.

7. The method as claimed in claim 6, wherein the packet is a packet of a constrained network communication.

8. The method as claimed in claim 1, further comprising:
receiving, from the second device an application layer protocol message comprising an encapsulated SDP message, wherein the SDP message has a session descriptor parameter comprising a numerical value in a binary format,
decapsulating the SDP message, and
converting a binary value of the session descriptor parameter of the SDP message into a text based session descriptor parameter.

9. The method as claimed in claim 8, wherein the converting the binary value comprises obtaining the text based session descriptor parameter corresponding to the binary value from a table.

10. The method as claimed in claim 1, further comprising, before the converting, receiving an application layer protocol message comprising a session description protocol message from a third device, for establishing a media negotiating with the second device.

11. A first device for negotiating session descriptor parameters with a second device over an application layer protocol, the first device being configured to:
- responsive to the second device being a resource-constrained device in a network where a size of a text based session descriptor parameter of a session description protocol (SDP) message is larger than an application layer protocol message payload size used in the network, converting a value of the text based session descriptor parameter of the session description protocol (SDP) message into a binary format to form a reduced-sized converted SDP message without any loss of information to be sent to the second device, wherein the value of the text based session descriptor parameter comprises a numerical value used to refer to the text based session descriptor parameter and the text based session descriptor parameter is a session descriptor parameter required to communicate with the second device, and wherein converting the value of the text based session descriptor parameter for a subset of text based session descriptor parameters comprises replacing the value of the text based session descriptor in the SDP message with a binary value corresponding to the value of the text based session descriptor and converting the binary value into the binary format;
- encapsulate the converted SDP message into an application layer protocol message; and
- send the application layer protocol message to the second device.

12. The first device as claimed in claim 11, further configured to convert the numerical value by obtaining a binary value corresponding to the value of the text based session descriptor parameter from a table.

13. The first device as claimed in claim 11, further configured to convert only values of mandatory session descriptor parameters into binary format.

14. The first device as claimed in claim 11, further configured to encapsulate the converted SDP message into a constrained application protocol, CoAP, message.

15. The first device as claimed in claim 14, further configured to encapsulate the converted SDP message in a payload of the CoAP message or in an option field of the CoAP message.

16. The first device as claimed in claim 11, further configured to encapsulate the SDP message in a single packet.

17. The first device as claimed in claim 16, wherein the packet is a packet of a constrained network communication.

18. The first device as claimed in claim 11, further configured to:
- receive, from the second device an application layer protocol message comprising an encapsulated SDP message, wherein the SDP message has a session descriptor parameter comprising a numerical value converted to a binary format, the session descriptor parameter being a parameter required for communication with the second device;
- decapsulate the SDP message; and
- convert a binary value of the session descriptor parameter of the SDP message into a text based session descriptor parameter.

19. The first device as claimed in claim 18, configured to convert the binary value by obtaining, from a table, the text based session descriptor parameter corresponding to the binary value.

20. The first device as claimed in claim 11, configured to, before the converting, receive an application layer protocol message comprising a session description protocol message from a third device, for establishing a media negotiating with the second device.

21. The first device as claimed in claim 11, configured to receive and/or send a media stream using the negotiated session descriptor parameters.

22. A non-transitory computer readable medium storing a computer program for a first device for negotiating session descriptor parameters with a second device over an application layer protocol, the computer program comprising computer program code, which, when executed on at least one processor on the first device causes the first device to perform the method according to claim 1.

23. A method performed in a constrained second device for negotiating session descriptor parameters with a first device over an application layer protocol, the method comprising:
- receiving, from the first device an application layer protocol message comprising an encapsulated session description protocol (SDP) message having a numerical value used to refer to a value of a session description parameter required to communicate with the constrained second device, the constrained second device in a network where a size of the text based session descriptor parameter of the session description protocol (SDP) message is larger than an application layer protocol message payload size used in the network, the numerical value being in a binary format;
- decapsulating the SDP message; and
- responsive to understanding the binary format, using a binary value of the session descriptor parameter of the SDP message in the negotiation or for the transmission of a media stream to the first device.

24. The method as claimed in claim 23, further comprising, before using the binary value, converting the binary value of a session descriptor parameter of the SDP message into a text based session descriptor parameter.

25. The method as claimed in claim 24, wherein the converting of the binary value comprises obtaining the text based session descriptor parameter corresponding to the binary value from a table.

26. A constrained second device for negotiating session descriptor parameters with a first device over an application layer protocol, the constrained second device being configured to:
- receive, from the first device an application layer protocol message comprising an encapsulated session description protocol (SDP) message, wherein the SDP message has a session descriptor parameter comprising a numerical value, the numerical value being in a binary format, the session descriptor parameter being a parameter required for communication with the constrained second device, the constrained second device in a network where a size of the text based session descriptor parameter of the session description protocol (SDP) message is larger than an application layer protocol message payload size used in the network;
- decapsulate the SDP message; and
- responsive to understanding the binary format, use a binary value of the session descriptor parameter of the SDP message in the negotiation or for the transmission of a media stream to the first device.

27. The constrained second device as claimed in claim 26, further configured to, before the use of the binary value, convert the binary value of a session descriptor parameter of the SDP message into a text based session descriptor parameter.

28. The constrained second device as claimed in claim 27, further configured to convert the binary value by obtaining the text based session descriptor parameter corresponding to the binary value from a table.

29. A non-transitory computer readable medium storing a computer program for a constrained second device for negotiating session descriptor parameters with a first device over an application layer protocol, the computer program comprising computer program code, which, when executed on at least one processor on the constrained second device causes the constrained second device to perform the method according to claim 23.

30. The method as claimed in claim 1, wherein sending the application layer protocol message to the second device comprises transmitting the application protocol message through a radio frequency (RF) transmitter circuit to the second device.

* * * * *